United States Patent [19]
Fisk et al.

[11] Patent Number: 5,790,847
[45] Date of Patent: Aug. 4, 1998

[54] INTEGRATION OF GROUPWARE WITH ACTIVITY BASED MANAGEMENT VIA FACILITATED WORK SESSIONS

[75] Inventors: Deboranne Fisk, Vestal; Philip David Heinlein, Binghamton; Mari Walsh Rush, Endicott, all of N.Y.

[73] Assignee: International Business Machines Corporation, Armonk, N.Y.

[21] Appl. No.: 248,617

[22] Filed: May 23, 1994

[51] Int. Cl.[6] ........................................ G06F 17/30
[52] U.S. Cl. ...................... 395/604; 395/601; 395/609; 395/610; 395/613; 395/619; 395/683; 395/209; 380/24; 118/500
[58] Field of Search .................... 395/600, 650, 395/54, 601, 604, 609, 610, 613, 619, 683, 209; 364/401; 380/24; 118/500

[56] References Cited

U.S. PATENT DOCUMENTS

| | | | |
|---|---|---|---|
| 4,445,181 | 4/1984 | Yatman | 364/464 |
| 4,875,162 | 10/1989 | Ferriter et al. | 364/401 |
| 5,111,391 | 5/1992 | Fields et al. | 364/401 |
| 5,167,011 | 11/1992 | Priest | 395/54 |
| 5,182,705 | 1/1993 | Barr et al. | 364/401 |
| 5,220,501 | 6/1993 | Lawlor et al. | 364/408 |
| 5,233,513 | 8/1993 | Doyle | 354/401 |
| 5,237,497 | 8/1993 | Sitarski | 364/402 |
| 5,303,367 | 4/1994 | Leenstra, Sr. et al. | 395/600 |
| 5,408,333 | 4/1995 | Kojima et al. | 358/400 |
| 5,423,038 | 6/1995 | Davis | 395/650 |

OTHER PUBLICATIONS

Minder Chen and Yihwa Irene Liou, "The Design of an Integrated Group Support Environment", IEEE, pp. 333-342, Dec. 1991.

*Primary Examiner*—Thomas G. Black
*Assistant Examiner*—Cheryl R. Lewis
*Attorney, Agent, or Firm*—Michael E. Belk; Douglas M. Clarkson

[57] ABSTRACT

A network application for automatically formatting and printing documents to be used as product planning manuals organizational personnel in determining product cost based on activities performed to produce the product. Output documents can also be dispersed among organizational personnel to provide common information for integrated strategic planning. Facilitated collaborative work sessions among work groups inputting and sharing comments and ideas provide starting data to the network application.

6 Claims, 20 Drawing Sheets

FLOWCHART OF THE ACTIVITY ALLOCATION

Sample Agendas

Pre-Session Planning Agenda

* Determine Customer Objectives
* Identify Participants and Roles
* Schedule Initial ABC Session
* Create Overhead Model Cross-Functional Business Process Modeling Session Agenda

* Administrative
* Review Objectives
* Overview of ABM, TeamFocus and the Methodology we will be Using
* Verify Organization Chart
* Cross-Functional Business Process Model Departmental Activity Modeling Session Agenda

* Administrative
* Review Objectives
* Overview of ABM, TeamFocus and the Methodolology we will be Using
* Verify Organization Chart
* Review Overhead Model
* Review Business Process Model
* Create Department Primary and Secondary Activity Model Cost Allocation Session Agenda

* Identify and Allocate Resource and Activity Drivers
* Quantify Resource and Activity Drivers Post-Session Agenda

* Develope Documentation
* Hold Executive Review

SAMPLE ABM SESSION AGENDA

FIG.1

FLOWCHART OF THE PRE-SESSION MEETINGS

FLOWCHART OF THE CROSS-FUNCTIONAL PROCESS MODELING SESSIO

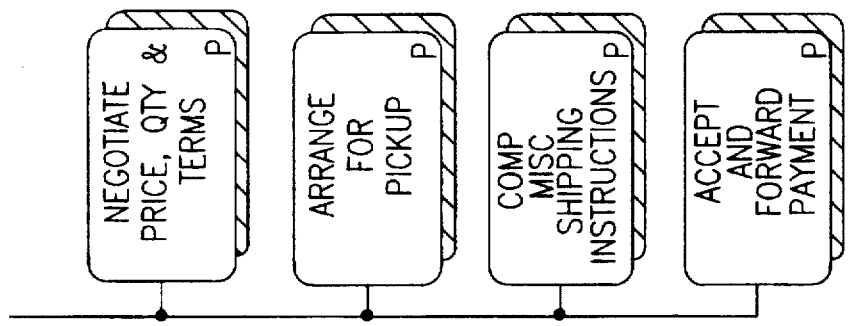
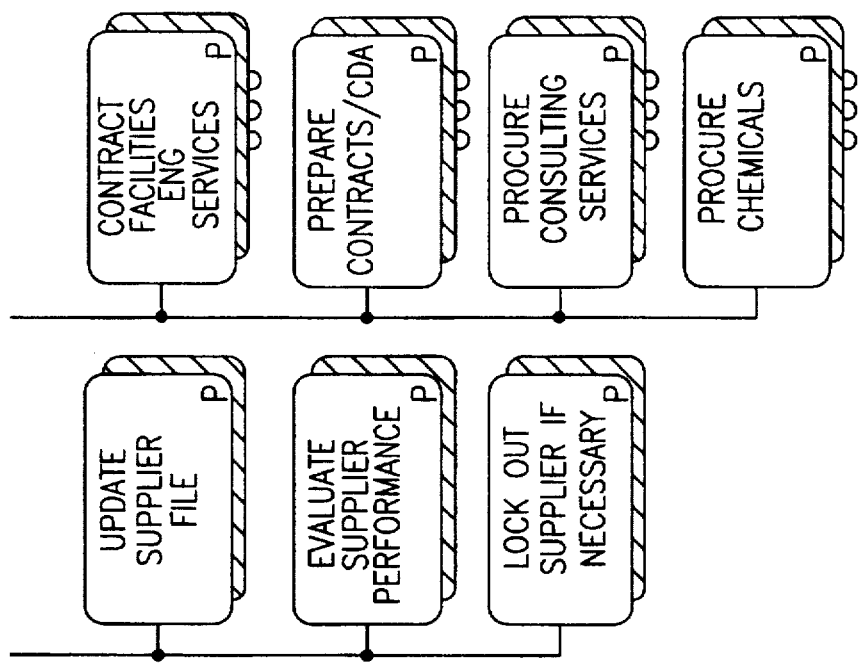
EXAMPLE OF A PROCESS DIAGRAM IN ADW
FIG.4B
FIG.4

FLOWCHART OF THE DETAILED DEPARTMENT MODELING SESSION

FLOWCHART OF THE RESOURCE ALLOCATION

FLOWCHART OF THE ACTIVITY ALLOCATION

OVERALL SYSTEM CONFIGURATION AND FILE SERVER (1) PROMPT USER FOR PATH TO SESSION INFORMATION FILE AND VERIFY THAT IT EXISTS
(2) FILL A LIST BOX WITH EACH SESSION NAME AVAILABLE
(3) SET DEFAULT SOURCE AND DESTINATION PATHS AS CURRENT DIRECTORY
(4) VERIFY USER SELECTIONS
(5) OPEN THE OUTPUT DATABASE FILE
(6) READ THE FIRST RECORD FROM THE TREE STRUCTURE FILE
(7) AS LONG AS THERE ARE RECORDS IN THE INPUT FILE, DO THE FOLLOWING:
(8) CHECK RECORD FOR 3 ASTERISKS
(9) IF 3 ASTERISKS, THEN DO THE FOLLOWING:
(10) START NEW SESSION IN ARRAY AND BUMP SECCTR BY 1
(11) READ THE NEXT 7 LINES AND ASSIGN TO SECNUM, PNODENUM, NUMNODES, PNODENAM, NODENAM, CHILDNUM, AND NODENUM
(12) 
(13) ELSE DO THIS
(14) KEEP CURRENT SECNUM, PNODENUM, NUMNODES, AND PNODENAM VALUES
(15) ASSIGN CURRENT RECORD TO NODENAM
(16) READ THE NEXT 2 LINES AND ASSIGN TO CHILDNUM AND NODENUM
(17) END IF
(18) LOOP BACK TO STEP (7)
(19) DO FOR EACH SECCTR
(20) IF LABEL FILE EXISTS FOR THAT SECTION, OPEN AND READ A RECORD
(21) AS LONG AS THERE ARE RECORDS, DO THE FOLLOWING:
(22) READ PAIRED LINES FOR EACH NODE IN THE CURRENT SECTION AND ASSIGN THE SECOND LINE TO THE COMFILE FIELD IN THE ARRAY
(23) 
(24) LOOP TO STEP (21)
(25) LOOP TO STEP (19)
(26) NOW LOOP THROUGH THE ARRAY AND WRITE THE RECORDS TO THE OUTPUT FILE
(27) EXIT THE PROGRAM

PSEUDOCODE OF THE TEAMFOCUS® EXPORT BRIDGE

| FIG. 11A(a) | FIG. 11A(b) |

FIG.11A(a)

```
Pseudocode of the ABC Bridge
*EasyABC Bridge Program (produces EasyABC Import files)

Initialize Program Variables
    Set Source Directory Path
    Set Output Directory Path Verify Input Files Exist
    Check Source Directory for Microsoft Acess DB GO Files Open EasyABC Import Files
    Open DECOMPOSITION_BY_REF_# (activities)
    Open DECOMPOSITION_BY_REF_# (cost objects)
    Open NOTES_STATIC (activities and cost objects)
    Open DRIVER_LIST (resource and activity drivers)
    Open SOURCE_DESTINATION_ALLOCATION (resource allocations)
    Open SOURCE_DESTINATION_ALLOCATION (activity allocations)
    Open ALLOCATION_QUANTITY_ACTUAL (resource allocations)
    Open ALLOCATION_QUANTITY_ACTUAL (activity allocations)
    Open ALLOCATION_QUANTITY_ACTUAL (driver value allocations)

Build EasyABC Import Text Files
    Read Microsoft Access DB for Activities (Group Outliner)
    For each List Item
      Build Activity Record (for DECOMPOSITION_BY_REF_# file)
        Write Item Reference Number (GO Node Number)
        Write Item Name (Activity Name)
        Write Item Type (E for element)
```

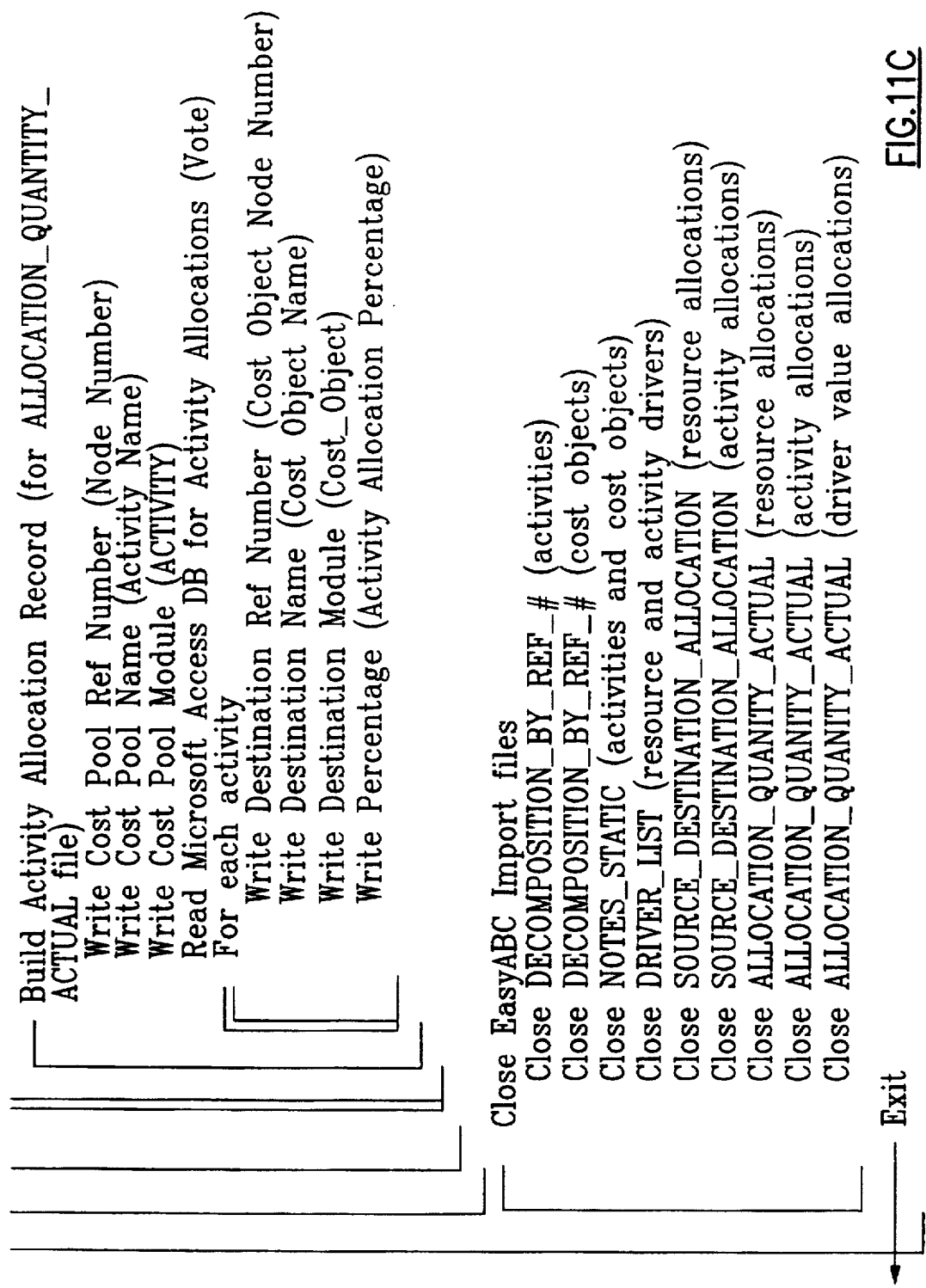

ABC TECHNOLOGY EASYABC ® IMPORT FILE TEMPLATES

DATA FILE FORMATS
HEADER
```
EASYABC
VERSION           <VERSION NUMBER>
<MODULE>
<TYPE OF DATA>
...
```

ALLOCATION_QUANTITY_ACTUAL AND ALLOCATION_QUANTITY_BUDGETED
```
<HEADER>
[PERIOD                                              <PERIOD FOR DATA>]
[ADD_VALUES OR SUBSTITUTE_VALUES]
DRIVER_QUANTITIES
<DRIVER NAME>
<DESTINATION REFERENCE NUMBER>    [DESTINATION NAME]  <DESTINATION MODULE>   <DRIVER QUANTITY>
<DESTIONATION REFERENCE NUMBER>   [DESTINATION NAME]  <DESTINATION MODULE>   <DRIVER QUANTITY>
...
[PERIOD                                              <PERIOD FOR DATA>]
...
```

```
<HEADER>
[PERIOD                                              <PERIOD FOR DATA>]
PERCENT_QUANTITIES
<COST POOL REFERENCE NUMBER>      [COST POOL NAME]    <COST POOL MODULE>
<DESTINATION REFERENCE NUMBER>    [DESTINATION NAME]  <DESTINATION MODULE>   <PERCENTAGE>
<DESTINATION REFERENCE NUMBER>    [DESTINATION NAME]  <DESTINATION MODULE>   <PERCENTAGE>
...
[PERIOD                                              <PERIOD FOR DATA>]
...
```

<MODULE>: ALL_MODS, OVERHEAD, ACTIVITY, OR COST_OBJECT
<DESTINATION MODULE>, <COST POOL MODULE>: OVERHEAD, ACTIVITY, OR COST_OBJECT

FIG.12A

DECOMPOSITION_BY_REF_#

<HEADER>
<NUMBER OF PATTERNS>

<PATTERN POSITION>      <NUMBER OF DIGITS IN PATTERN>    <MODULE LEVEL>
<PATTERN POSITION>      <NUMBER OF DIGITS IN PATTERN>    <MODULE LEVEL>
...
<ITEM REFERENCE NUMBER>   <ITEM NAME>    <ITEM TYPE>
<ITEM REFERENCE NUMBER>   <ITEM NAME>    <ITEM TYPE>
...

<MODULE>: OVERHEAD, ACTIVITY, OR COST_OBJECT
<ITEM TYPE>: C,A,E, OR AE

DRIVER_LIST

<HEADER>
<DRIVER NAME>
<DRIVER NAME>
...

<MODULE>: ALL_MODS, OVERHEAD, ACTIVITY, OR COST_OBJECT

NOTES_STATIC

<HEADER>
NEW_NOTE
<ITEM REFERENCE NUMBER>   [ITEM NAME]    <ITEM TYPE>
<NOTE>
NEW_NOTE
...

<MODULE>: OVERHEAD, ACTIVITY, OR COST_OBJECT
<ITEM TYPE>: C,A,E, OR CP

FIG.12B(a)

```
SOURCE_DESTINATION_ALLOCATION
<HEADER>
NEW_SOURCE
<COST POOL REFERENCE NUMBER>    [COST POOL NAME]      <COST POOL MODULE>    [ALLOCATION METHOD]
<DESTINATION REFERENCE NUMBER>   [DESTINATION NAME]    <DESTINATION MODULE>
<DESTINATION REFERENCE NUMBER>   [DESTINATION NAME]    <DESTINATION MODULE>
...
NEW_SOURCE
...
```

<MODULE>: ALL_MODS, OVERHEAD, ACTIVITY, OR COST_OBJECT

<DESTINATION MODULE>, <COST POOL MODULE>: OVERHEAD, ACTIVITY, OR COST_OBJECT

[ALLOCATION METHOD]: PERCENT_EVENLY, PERCENT_USER_SPECIFIED, OR THE NAME OF A DRIVER

FIG.12B(b)

| FIG. 12B(a) |
|---|
| FIG. 12B(b) |

FIG.12B

INTEGRATION OF GROUPWARE WITH ACTIVITY BASED MANAGEMENT VIA FACILITATED WORK SESSIONS

CROSS REFERENCES TO RELATED APPLICATIONS

This application claims priority under 35 U.S.C. § 120 as a continuation-in-part application of U.S. patent application Ser. No. 08/229,967, filed Apr. 19, 1994, entitled "The Application of Groupware to ISO 9000 Registration via Facilitated Work Sessions", and now abandoned.

U.S. patent applications Ser. Nos. 08/248,616, entitled "The Integration of Groupware with the Quality Function Deployment Methodology via Facilitated Work Sessions", and now abandoned and 08/247,817, entitled "The Integration of Groupware with the Integrated Quality Control Methodology via Facilitated Work Sessions", and now abandoned, filed concurrently herewith are assigned to the same assignee hereof and contain subject matter related, in certain respect, to the subject matter of the present application. The above-identified patent applications are incorporated herein by reference.

BACKGROUND OF THE INVENTION

1. Field of the Invention

This invention relates to a computer network application for sharing, combining, formatting, and printing into a predetermined document format information gathered from a number of users or work groups formed within an organization to determine product cost based on activities performed to produce the product. This application is based on Activity Based Management and is implemented in a networked, multi-user environment. In particular, this invention effectuates the documentation of product development activities via facilitated computer-based, cooperative work sessions, thereby streamlining the procedures required to determine accurate product development costs.

Activity Based Management (ABM) is a recognized methodology for understanding and controlling the cost of products through business process management. ABM identifies the total cost of a process, tracks value-add and non value-add efforts, and provides an easily understood methodology for encouraging continuous improvement. Activity Based Costing (ABC) is a financial model and the basis for ABM. Conventional costing is based on the premise that products consume resources. ABC professes that products consume activities and activities consume resources.

2. GroupWare

GroupWare refers to computer applications that allow groups of people to work together through the sharing of information. Most GroupWare products provide one or more of the following functions:

Calendar
Electronic Mail
Word Processing
Data or Document Management
Group Decision Support
Work Flow Support GroupWare products all run on a network, so that information is easily shared and accessible to all users who need it. ABC Technology EasyABC is a software product that builds an ABC financial model. TeamFocus is a GroupWare product that provides group decision support functions in an electronic meeting setting.

SUMMARY OF THE INVENTION

This invention comprises a network application for manipulating information gathered in a multi-user collaborative environment in order to conduct Activity Based Management sessions. The information gathered in the multi-user environment includes input such as comments and ideas from financial analysts or from cross-functional modeling team members. These are input into computer storage to be accessed by special programs for formatting and printing in predefined formats. GroupWare tools allow the team members to quickly organize their ideas, reach consensus, and make decisions. Activity Based Management data such as cost drivers, activities, and cost driver allocations can be programmed for automatic input into ABC software applications. User intervention is unnecessary after the information gathering session and before the import into the ABC application. An initial facilitated work session defines resources and products and identifies high level processes. Additional facilitated work sessions are held to define activities at a department level and allocate cost drivers. The cost driver is the method by which a resource is allocated (or driven) to an activity and an activity allocated to a product. For example, a labor resource is driven to an activity via the number of hours spent on the activity. "number of hours" would be the cost driver. The participants in the information gathering sessions are prompted to identify the ABM data. Networked PC's and workstations facilitate the information gathering among the work groups, organization of the data gathered, and group approval of the final organized lists. They also aid in the prioritization of the data and in determining the cost driver allocations. Commercially available group decision support tools fit very well with these information gathering sessions. Commercially available database tools work well for storage of and access to the data that is collected in these information gathering sessions. Specialized bridge programs automate the movement of data between these various tools. Commercially available GroupWare applications that support document management can make the latest version of reports and documents available to all personnel in the organization.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a sample ABM Session Agenda.

FIG. 9 is a pseudocode implementation of the EXPORTGO bridge program.

FIGS. 11a–c are a pseudocode implementation of the EasyABC bridge program.

FIGS. 12a–b are ABC Technology EasyABC import file templates.

DESCRIPTION OF THE PREFERRED EMBODIMENT

Overview

Figure 2:
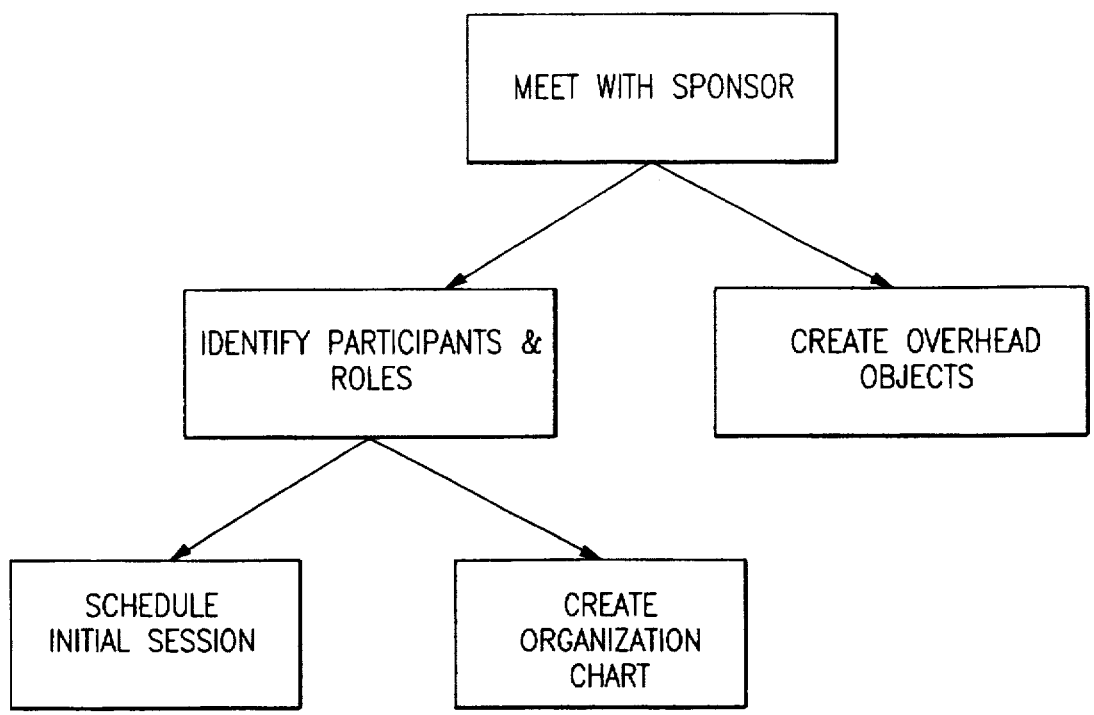
FIG. 2 is a flowchart of the Pre-Session Meetings.

Activity Based Management is a difficult and time-consuming process for any organization. The typical approach is to assign individuals to interview members of a business area. Lacking any tools or a proven approach, excessive resource and time is spent before the organization is ready to cost product based on activities performed. Since Activity Based Management is new to the organization, it is difficult to get started. Decisions need to be made on the scope of the ABC model, how to gather, organize and manage the activity information and how to educate the necessary people. Managing the information necessary to use ABM is difficult without a software tool, especially for a large organization. Software tools however add an additional learning curve. Once the activities are underway difficulties still exist. Typically there is a great deal of data to be entered into an ABM model. Also, the management of the model is difficult to administer. Even after the model is complete, organizational changes do occur that will mean frequent updates to the model. All of this is difficult to achieve without tools and a methodology.

Technical Background

This invention provides a more efficient means to collect and organize the data captured during Activity Based Management sessions and a process to transform the data into a format usable by existing database and ABC software applications. The approach to Activity Based Management described here is being used successfully in IBM. IBM's GroupWare product, TeamFocus, is used in facilitated work sessions for Activity Based Management. TeamFocus is a GroupWare product that provides group decision support functions such as:

Electronic Brainstorming

Idea Organization

Voting

Topic Commenting

Alternative Evaluation

Group Outlining

Group Matrix

One type of facilitated work session documents the business process. Electronic meeting software such as IBM's TeamFocus or Ventana GroupSystems V can quickly capture this information from cross-functional teams. After that, another type of facilitated work session collects the detailed activities from departmental teams. Electronic meeting software can collect this information much faster than in a traditional group meeting. The meeting facilitator helps the group achieve consensus, keeps them focused on the tasks, and moderates the discussions so that dominant personalities do not take over the meeting. Another type of facilitated session collects the cost driver allocations. This too can be collected much faster with electronic meeting software.

Following the facilitated sessions the resulting data is stored in a database tool such as Microsoft Access, thus making the data available for import into process modeling and ABC Cost modeling software tools. The import file can be produced automatically by specialized bridge programs. The ABC reports can be stored in a another GroupWare tool for document management, such as LotusNotes, for access throughout the organization. The most recent version of the document can be stored online where it can be retrieved by any team member that requires it, provided they are on that network.

Pre-Session Planning

Pre-session planning is required to determine the goals and objectives of the session sponsor and to properly assess the scope of the assignment. Referring to FIG. 1, there are 4 distinct steps in pre-session planning: meeting with the sponsor to determine the customers objective; identify participants and their roles; schedule the initial ABC sessions; and create the overhead object model.

Referring to FIG. 2, the Pre-Session Planning starts with a meeting with the session sponsor to discuss various issues, assess the scope of the project, and to properly set expectations. Next, the sponsor must identify the session participants. These people must be able to represent the business area within the scope of the ABC project. The facilitator explains the roles of the participants as well as the facilitator and tools specialist.

If additional personnel needed to answer specific questions, they should also be identified at this time. The facilitator will stress the importance of having the right people as participants and the need for all participants to attend required sessions. The facilitator will use the Group Outliner tool in TeamFocus or Ventana GroupSystems V to create an Organization Chart. For each first level department, a separate session within Group Outliner should be made. These department sessions will be used in the Detailed Department Sessions. The facilitator will then work with the sponsor to schedule the initial process modeling sessions. The modeling sessions may require different participants since it is a cross-functional view of the business process. The facilitator will then work with the sponsor or their representative to create the overhead objects in Easy-ABC. This may be done by manual input of the ledger data or by using the ABC Technology EasyABC import function.

Cross-Functional Process Modeling Session

Figure 8:
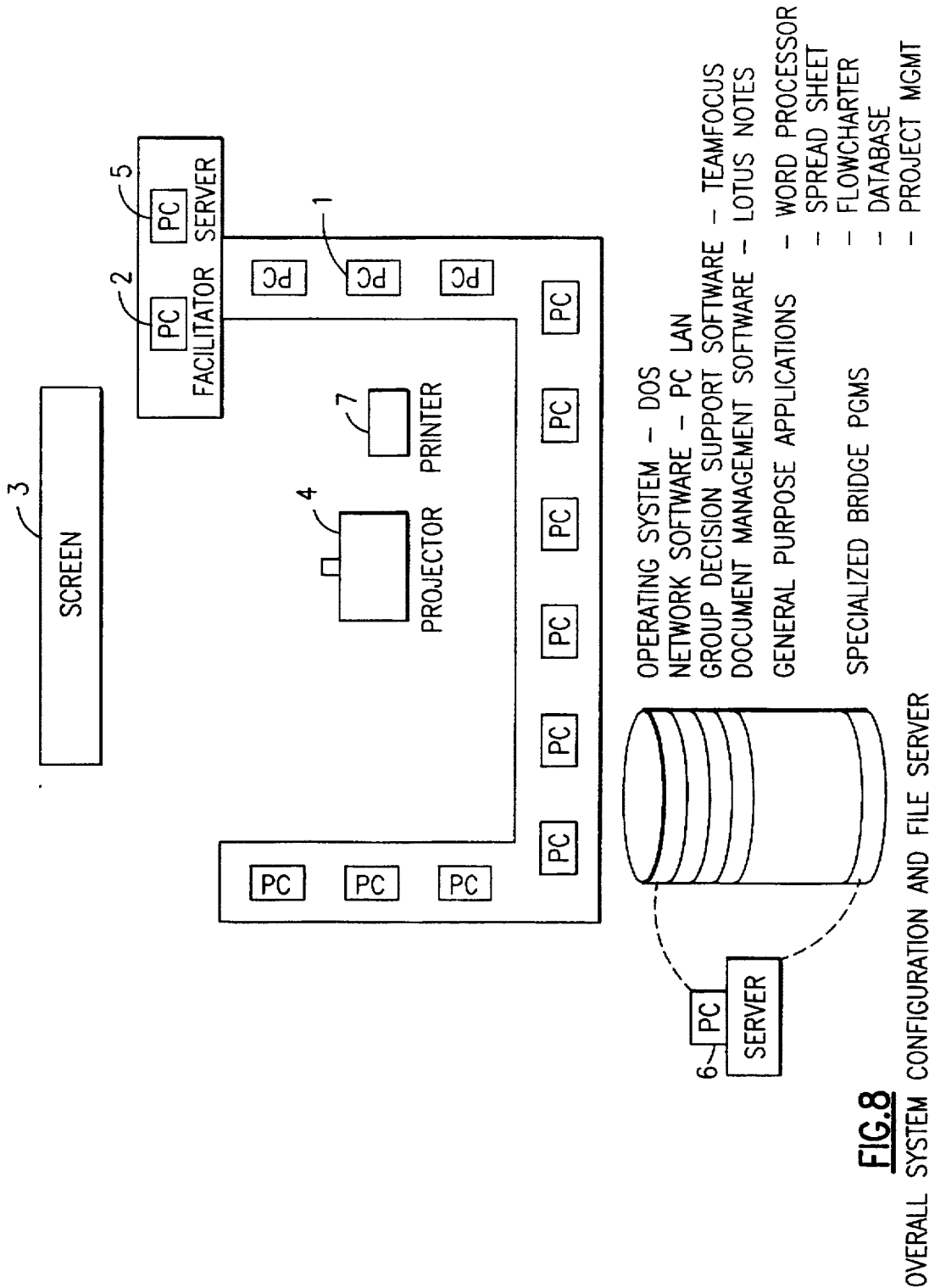
FIG. 8 is a representation of the overall system configuration and the various applications available on the file server.

Because Activity Based Management is the management of a business process by examining the cost of the activities within the process, a cross-functional process view is needed as well as the organizational department view. Referring to FIG. 8, the cross-functional process team group gathers in a joint meeting to provide input in response to questions provided by a facilitator, shown as a PC (2). The PC server (5), operating system (6) and applications (6) are also shown. The session can also include a projector (4) and screen (3) for viewing and a printer (7) for hardcopy output. Each process team member participates in the meeting via a PC (1) and the questions and answers may be selectively displayed on the screen or on each PC.

Figure 3:
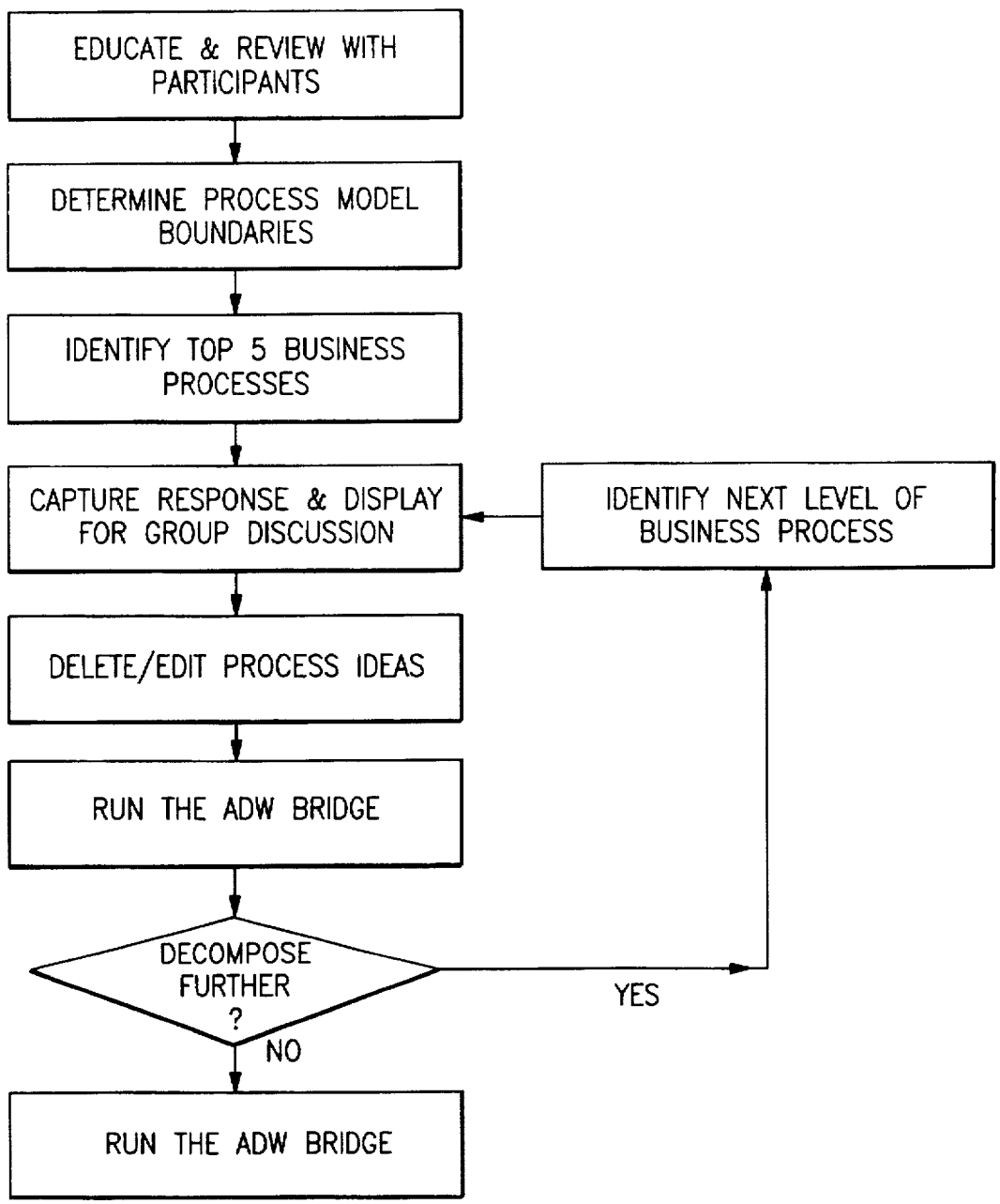
FIG. 3 is a flowchart of the Cross-Functional Process Modeling session.
Figure 4A:
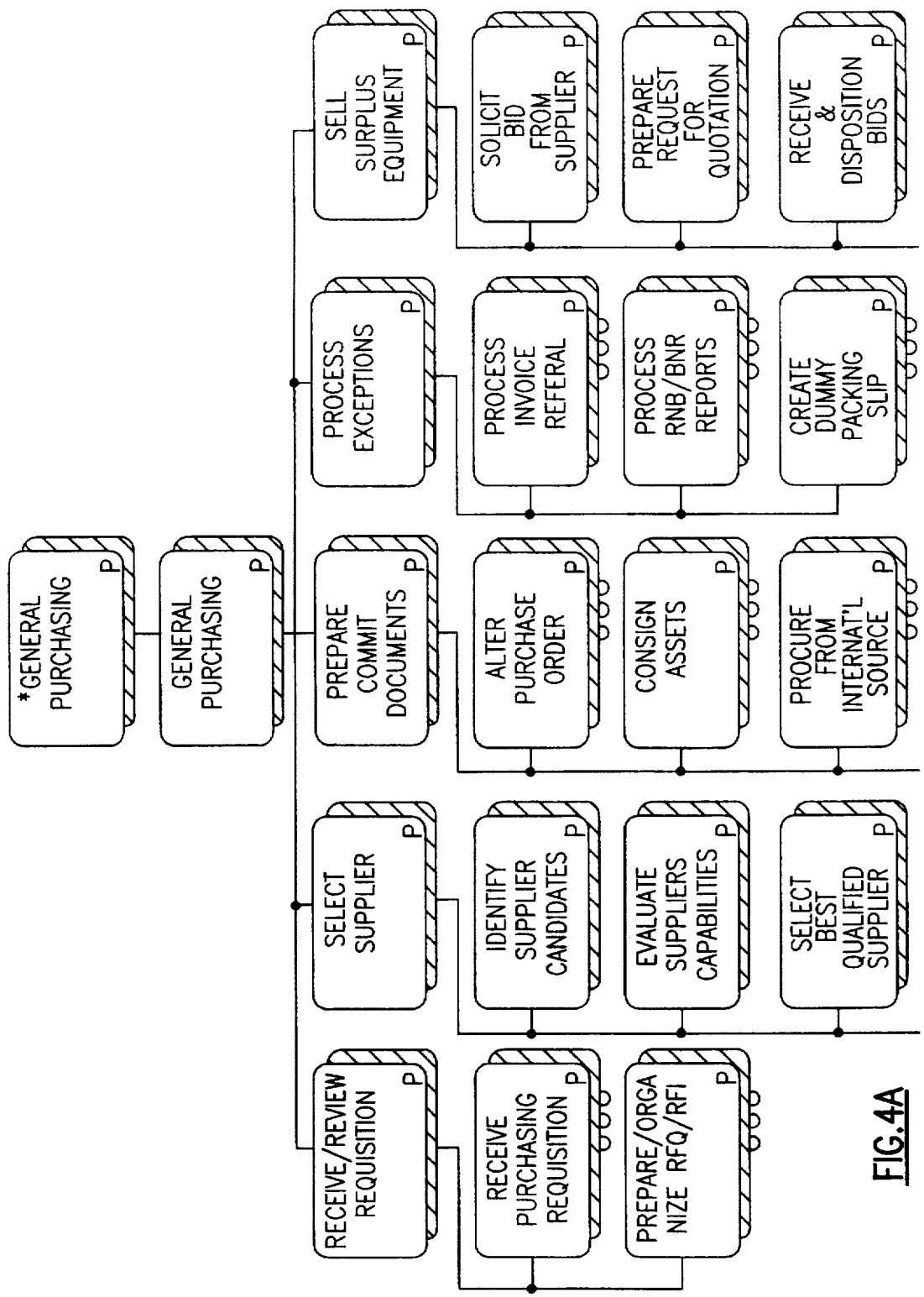
FIG. 4 is an example of a Process Diagram in ADW.

Referring to FIG. 3, the Cross-Functional Process Modeling session starts with a discussion, led by the facilitator, to identify the boundaries of the process. Once they are determined, the participants identify what they consider to be the top 5 business processes. To capture this information, a GroupWare tool like TeamFocus or Ventana GroupSystems V Group Outliner is used. The team's responses are displayed on a screen visible to all and the responses are edited until the group is in agreement on the top business processes. The team then develops a definition for each process. The TeamFocus session data is copied to diskette and exported to a database tool such as Microsoft Access for storage and later retrieval. The TeamFocus session data is converted into import files for the KnowledgeWare ADW CASE tool by a specialized ADW bridge program. The session data is loaded into the KnowledgeWare ADW CASE tool using ADW's import utility. The "decomposition diagram" can then be constructed in the ADW CASE tool. See FIG. 4 for an example of an ADW process decomposition diagram. Hardcopy documentation may be generated from TeamFocus, the Microsoft Access database, or from the ADW CASE tool. The documentation can also be stored in a GroupWare tool such as LotusNotes, a document management tool, for sharing the process information across the organization. The team will then continue to decompose each of the processes down to an activity level in the same manner as described above.

Detailed Department Modeling Session

The detailed department view is the second part of ABM. This is the level where costs can correctly be identified. In the detailed department modeling sessions, costs associated with a department are allocated to the activities performed within that department. There are two types of activities performed by any given department: activities that are primary to the process, and activities that are secondary to the process. Prior to a department's session, the facilitator highlights the activities (or lowest level processes) in the process model in Group Outliner, and saves them in a separate file. This file is used in the department's session for determining which activities are performed within that department.

Figure 5:
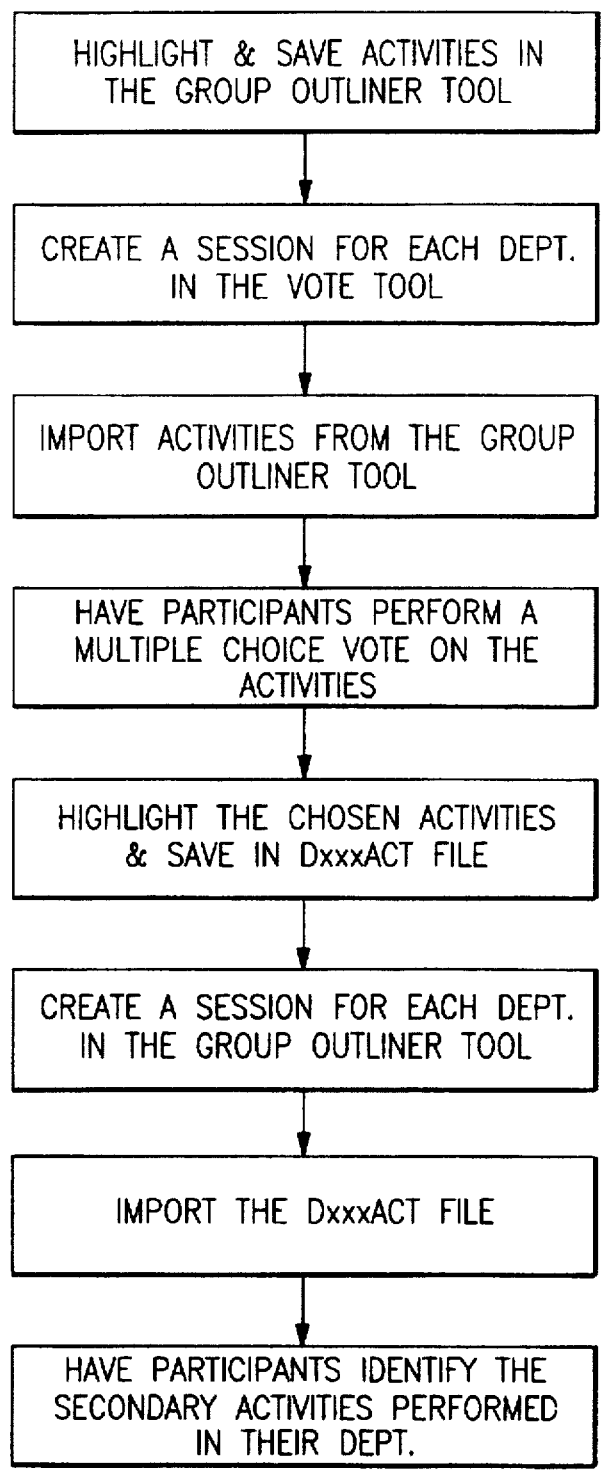
FIG. 5 is a flowchart of the Detailed Department Modeling session.

Referring to FIG. 5, the Department Modeling session begins with the facilitator creating an Activity Vote session in TeamFocus for the department. The activity file from Group Outliner is imported as the ballot items. Using the multiple choice vote, department members select the activities which are performed in their department. The results of the vote will be displayed and the chosen activities are highlighted. The TeamFocus session data is copied to diskette and exported to a database tool such as Microsoft Access for storage and later retrieval. The group next identifies the secondary activities within their department. In TeamFocus Group Outliner, the department members suggest secondary activities performed in their department. When this is complete, the results are displayed and discussed until consensus us reached. The TeamFocus session data is copied to diskette and exported to a database tool such as Microsoft Access for storage and later retrieval.

Resource Allocation Session

Figure 6:
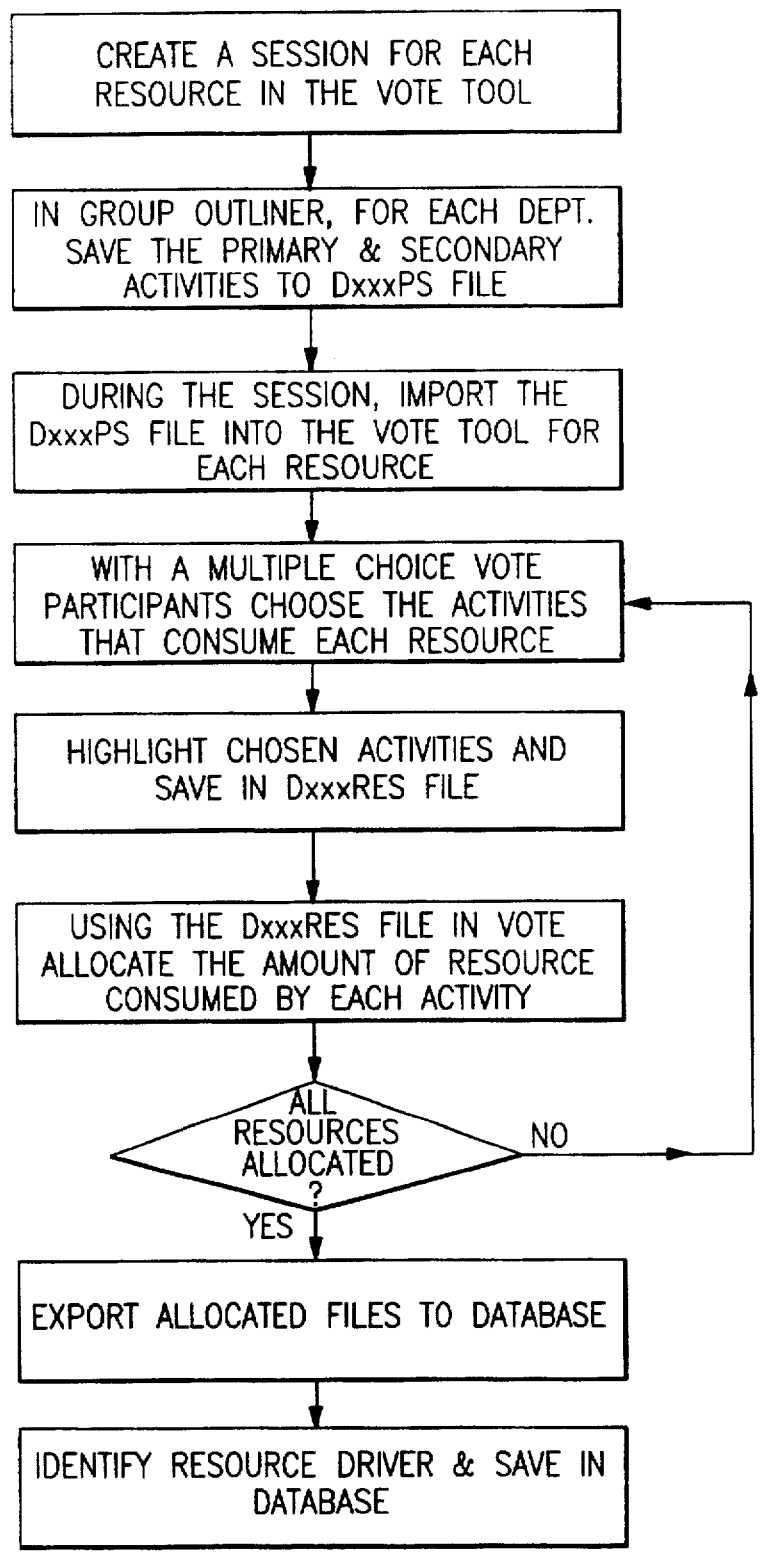
FIG. 6 is a flowchart of the Resource Allocation.

In the Resource Allocation session, the department members identify and allocate the "drivers" that influence (or drive) the cost of resources. Referring to FIG. 6, the session begins with the facilitator creating a TeamFocus Vote and Group Outliner session for each resource. Using the Group Outliner tool, for each resource the department members identify the activities that consume that resource. The facilitator imports the department's primary and secondary activities into the Vote session for each resource. The facilitator then sends the list of activities to the department members for a multiple choice vote. The department members then identify the activities which consume the resource. The facilitator highlights and saves the activities that were chosen in a file with the appropriate resource name. Next, the facilitator sets up a TeamFocus Vote session to determine the percentage of time spent on each activity. The activities that were chosen as "drivers" of the resource are imported into the Vote session. The department members then identify the percent of the resource consumed by each activity. Each activity must have an allocation, and the allocations must total 100 percent. The TeamFocus session data is copied to diskette and exported to a database tool such as Microsoft Access for storage and later retrieval. The group will then determine what the actual driver was for each resource. The information will be updated in the database.

Activity Allocation Session

Figure 7:
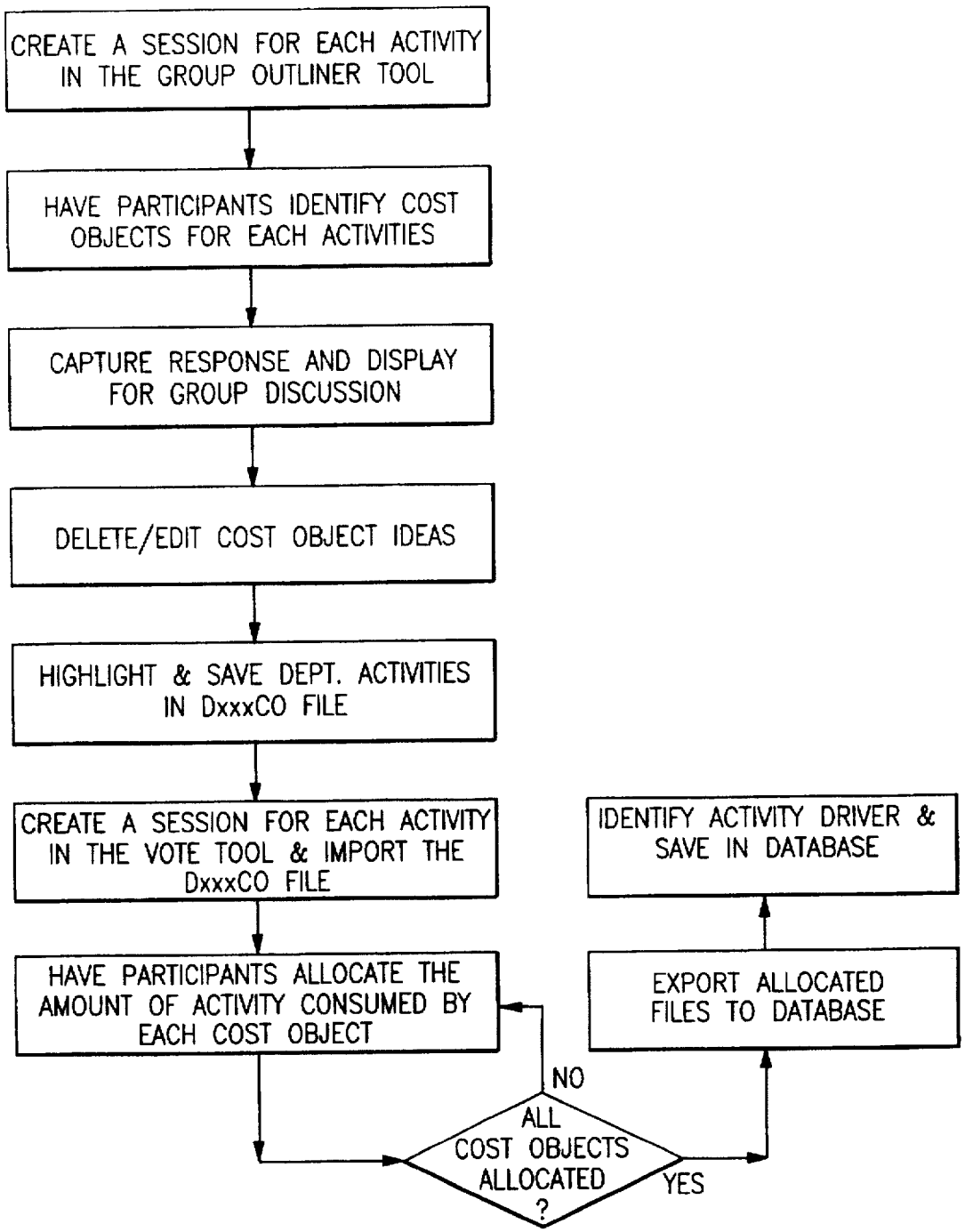
FIG. 7 is a flowchart of the Activity Allocation.

In the Activity Allocation session, the department members identify and allocate the "drivers" that influence (or drive) the cost of activities. Referring to FIG. 7, the session begins with the facilitator creating a TeamFocus Group Outliner session for each activity. Using the Group Outliner tool for each activity, the department members identify the cost objects that consume that activity. The facilitator imports the department's cost objects into a TeamFocus Vote session for each activity. The facilitator then sends the list of cost objects to the department members for a multiple choice vote. The department members then identify the cost objects associated with the activity. The facilitator highlights and saves the cost objects that were chosen in a file with the appropriate activity name. Next, the facilitator sets up a TeamFocus Vote session to determine the percentage of time spent on each cost object. The cost objects that were chosen as "drivers" of the activity are imported into the Vote session. The department members then identify the percent of the activity consumed by each cost object. Each cost object must have an allocation, and the allocations must total 100 percent. The TeamFocus session data is copied to diskette and exported to a database tool such as Microsoft Access for storage and later retrieval. The group will then determine what the actual driver was for each activity. The information will be updated in the database.

Bridge Programs

The TeamFocus sessions produce data files comprised of all the groups, responses to the facilitator's prompts for information. Upon execution of the export programs, these files are formatted into dBase III format for import into database tools, such as Microsoft Access. An export file from the database tool can be used by other bridge programs to construct import files for various tools such as ABC Technology EasyABC. Reports and documents can be created from the TeamFocus tool, the database tool, or from the ABC tools.

EXPORTGO

Referring to FIG. 9 showing a pseudocode implementation of the bridge program EXPORTGO, this specialized program used by IBM bridges data from a TeamFocus or Ventana GroupSystems V Group Outliner (GO) session to a dBase III database file. The program begins with a prompt to the user to enter the path to the SESSION.DBF file created by TeamFocus. The program then verifies that the path entered is correct, and if so, reads the file to determine the names of all available sessions. These are entered into a list box control on the main form. The default source and destination paths are set as the current directory. They can be changed by the user if need be. The user can select as many sessions as desired to be exported. When OK is clicked, the EXPORT program validates all data fields entered by the user. If all is valid, the Session Id for the first selected session is used to determine input file names. The file containing the GO tree structure is named "TREE_x.GO" where x is the Session Id. An entry of 3 asterisks separates each outline section in the file. When a new section is encountered, 7 lines are read and assigned to the variables secnum, pnodenum, numnodes, pnodenam, nodenam, childnum, and nodenum. If the line after these 7 is not 3 asterisks, then the record is another from the current section of the outline. Secnum, pnodenam, numnodes, and pnodenam stay the same as the current node. The current line is assigned to nodenam and 2 more lines are read into childnum and nodenum. This logic is repeated for the entire TREE_x.GO file until empty. Count and save the number of sections read. Next, do for i=1 to the number of sections read, try to open file L_x-i.GO, where x is the Session Id. If the file exists, do for the number of nodes in the current section the following: read two lines, the second being the comment file name, and assign to comfile. Loop. Then write the records to the DBase III file.

ADW Bridge

Figure 10A:
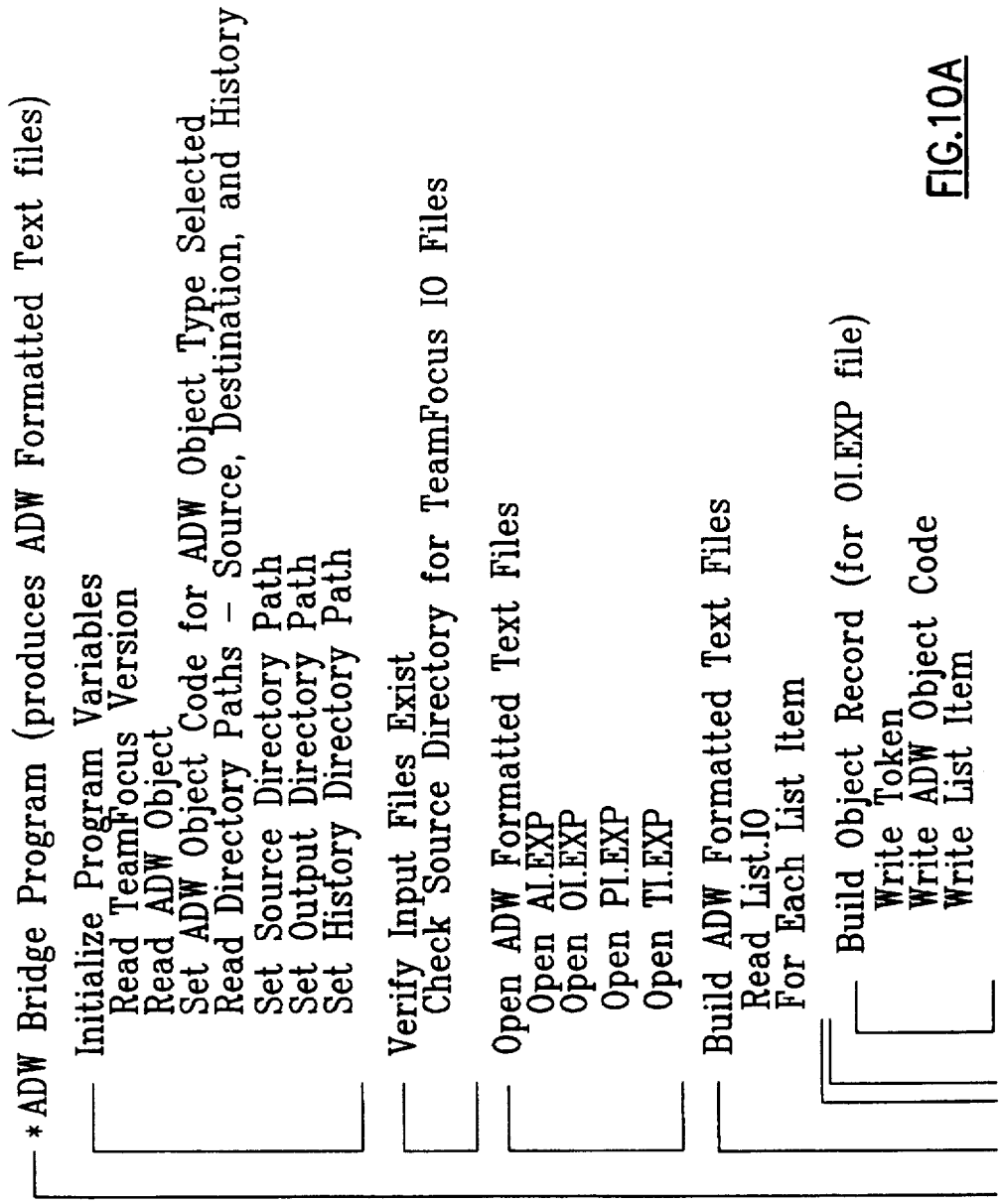
FIG. 10 is a pseudocode implementation of the ADW bridge program.
Figure 10B:
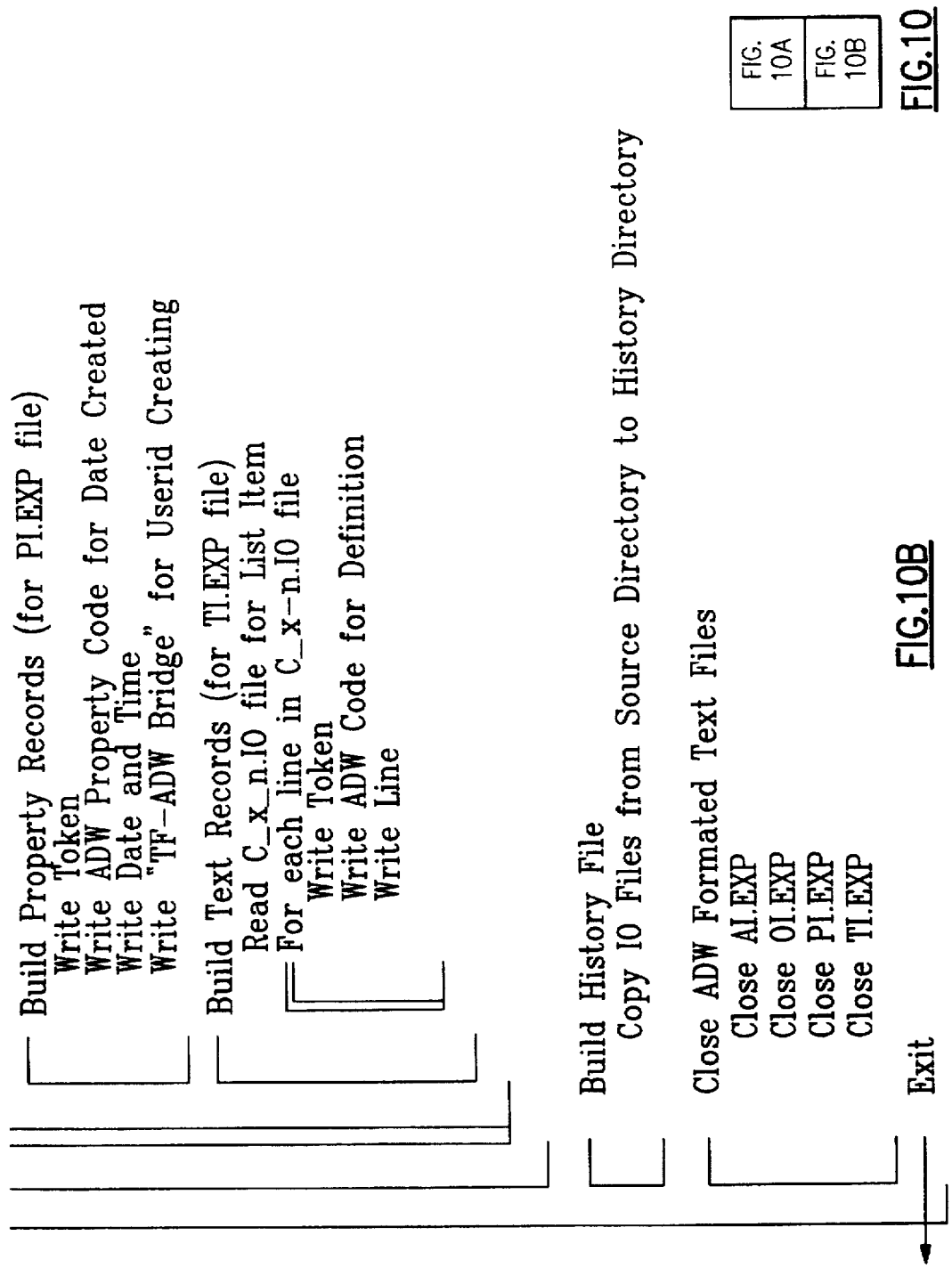

Referring to FIG. 10 showing a pseudocode implementation of the bridge program ADW, this specialized program used by IBM bridges data from TeamFocus to KnowledgeWare ADW. The program begins by initializing program variables based on data entered by the user on the options pull-down window. Program variables include the TeamFocus or Ventana GroupSystems V version, the type of ADW object being imported, and the source and destination directories. Variables are set to store this information. Next, the program checks to make sure the required input files are found in the source directory. It also makes sure the output directory exists, creating it if it doesn't already exist. The program then opens the four formatted text files used by KnowledgeWare ADW:

AI.EXP
OI.EXP
PI.EXP
TI.EXP

At this time the program builds these formatted text files based on the TeamFocus session data. It reads the LIST_x.IO file. For each list item, it builds an object record for the OI.EXP file. The object record contains a 12 digit token, the appropriate ADW object code, and the object name which is the list item. It then builds a property record for the PI.EXP file. The property record contains a 12 digit token, the ADW code for Date Created, the date and time, and "TF-ADW Bridge" for the userid. It then build a text records for the TI.EXP file. The program reads the comment file for the given list item and creates a record for each line of the comment file. The text records contain a 12 digit token, the ADW code for Definition, and the comment line. Depending on the type of ADW Objects being imported, the program may also create association records for the AI.EXP file. Not all ADW objects require associations. Once the formatted text files are created, the program ends by closing the files and writing them to the destination directory. If a history directory was indicated, then the source files are copied to the history directory for later use.

ABC Bridge

Figure 11A:
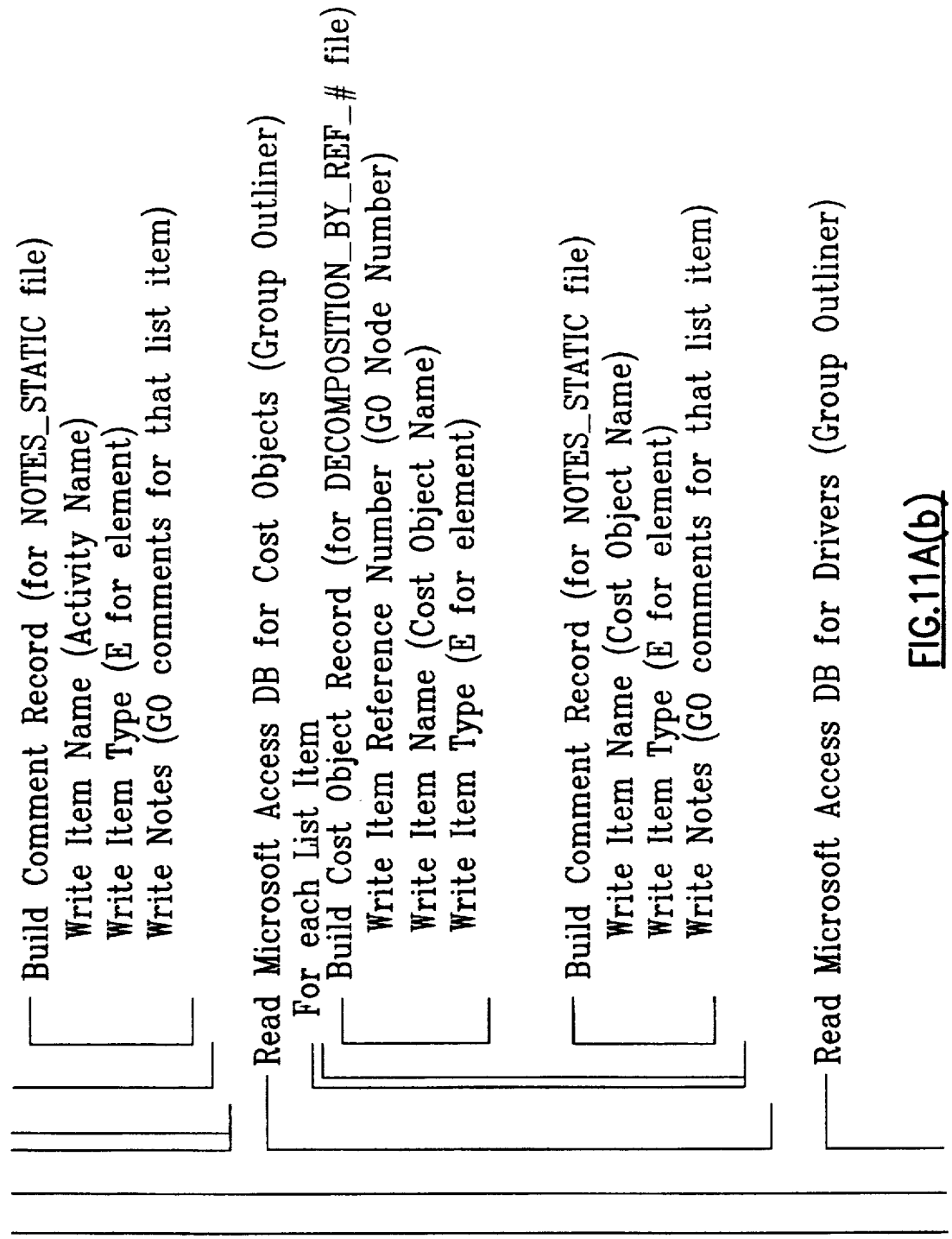
Figure 11B:
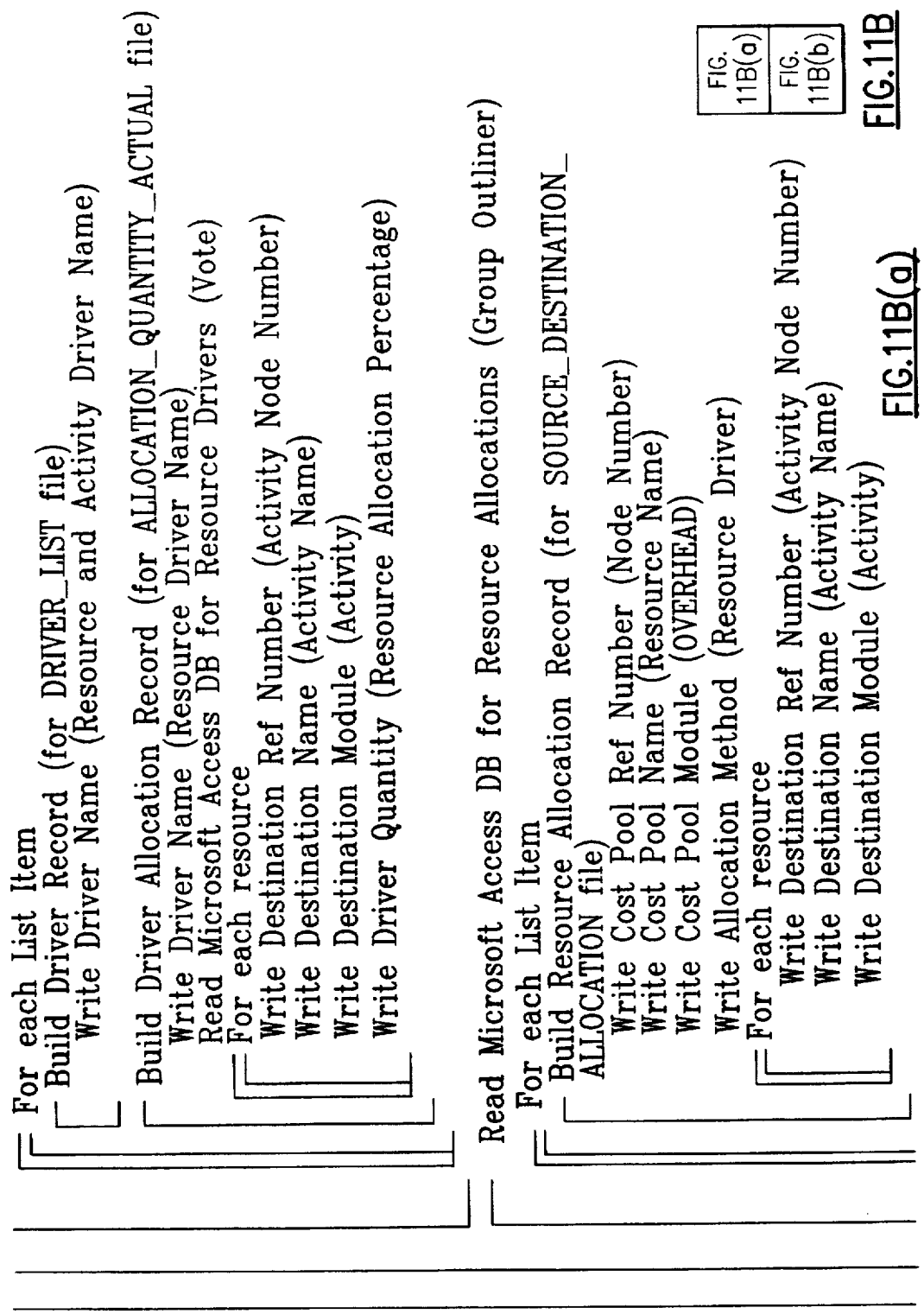
Figure 11B:
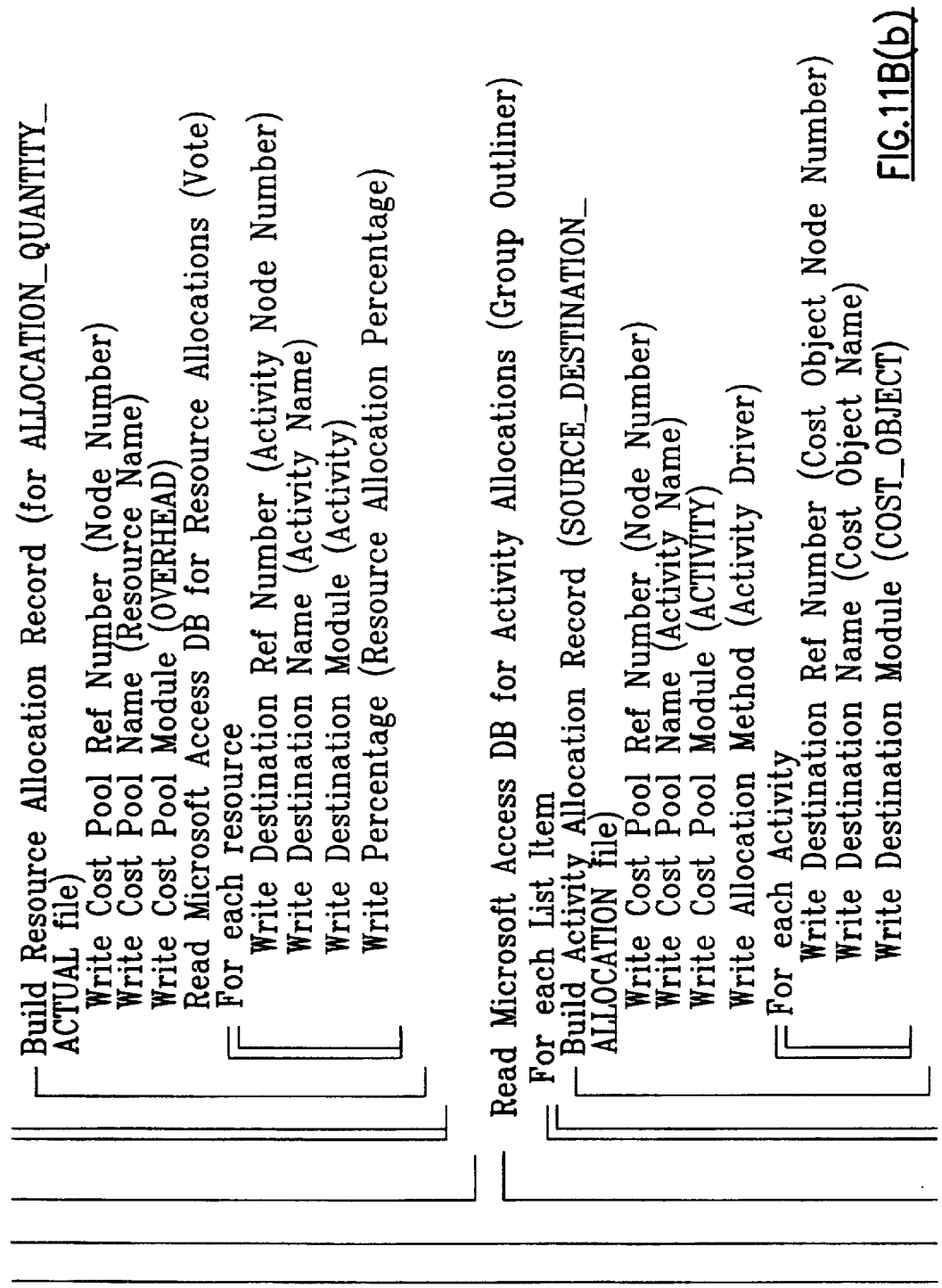

Referring to FIGS. 11a–c showing a pseudocode implementation of the bridge program ABC, this specialized program used by IBM bridges data from the Microsoft Access database to ABC Technology EasyABC. (See FIGS. 12a–b for a description of the import files for ABC Technology EasyABC). The program begins by creating an ABC Technology EasyABC DECOMPOSITION_BY_REF_# import file for activities. It reads the GO tables stored in the database and extracts the activities (both primary and secondary) for each department. The program uses the GO node number for the item reference number, the activity name for the item name, and an item type of "E" for element. Next, the program creates the DECOMPOSITION_BY_REF_# import file by cost object. It reads the GO tables store in the database and extracts the cost objects for each department activity. If a cost object is the same for more then one activity, only one cost object is extracted. The program uses the GO node number for the item reference number, the cost object name for the item name, and an item type of "E" for element. For duplicate names, the first node number is used. Then the program creates the NOTES_STATIC import files for comments, one for activities and one for cost objects. The program reads the GO Comments file for each item reference number in the two DECOMPOSITION_BY_REF_# files, extracts the item name, adds the item type of "E" for element, and the comments as notes. The fourth import file the program creates is the DRIVER_LIST. This list is created for both resource and activity drivers. The program reads the GO tables stored in the database and extracts the resource and activity driver names. The program then creates two SOURCE_DESTINATION_ALLOCATION import files, one for resource allocations and the other for activity allocations. For the resource allocation file, the program reads the GO tables stored in the database and extracts the resource allocation data. The program uses the resource node number as the cost pool reference number. It adds the resource name as the cost pool name and a cost pool module of "OVERHEAD". It extracts the resource driver as the allocation method. For each resource, the program finds each activity the resource is allocated to. It extracts the activity node number as the destination reference number, the activity name as the destination name, and a destination module of "ACTIVITY". For the activity allocation file, the program reads the GO tables stored in the database and extracts the activity allocation data. The program uses the activity node number as the cost pool reference number. It adds the activity name as the cost pool name and a cost pool module of "ACTIVITY". It extracts the activity driver as the allocation method. For each activity, the program finds each cost object the activity is allocated to. It extracts the cost object node number as the destination reference number, the cost object name as the destination name, and a destination module of "COST_OBJECT".

The last three import files created are the ALLOCATION_QUANTITY_ACTUAL import files for percentage allocations and driver value allocations. To create the resource actual allocation file by percentage, the program reads the GO tables stored in the database and extracts the resource allocation data. The program uses the resource node number as the cost pool reference number. It adds the resource name as the cost pool name and a cost pool module of "OVERHEAD". For each resource, the program finds each activity the resource is allocated to. It extracts the activity node number as the destination reference number, the activity name as the destination name, and a destination module of "ACTIVITY". Then it extracts the resource allocation as the percentage. To create the activity actual allocation file by percentage the program reads the GO tables stored in the database and extracts the activity allocation data. The program uses the activity node number as the cost pool reference number. It adds the activity name as the cost pool name and a cost pool module of "ACTIVITY". For each activity, the program finds each cost object the activity is allocated to. It extracts the cost object node number as the destination reference number, the cost object name as the destination name, and a destination module of "COST_OBJECT". Then it extracts the activity allocation as the percentage. To create the actual allocation file by driver value, the program reads the GO tables stored in the database and extracts the resource and activity allocation data for each unique driver. The program extracts the resource driver as the driver name. For each unique driver, the program finds each activity and/or cost object the driver allocates to. It extracts the activity or cost object node number as the destination reference number and the activity or cost object name as the destination name. It adds a destination module of "ACTIVITY" or "COST_OBJECT" as appropriate and extracts the resource or activity allocation as the driver quantity. Once the program has created these import files, they can be imported into ABC Technology EasyABC using ABC Technology EasyABC's import facility.

Other Bridge Programs

Other bridge programs can similarly be written for various analysis tools chosen by the ABC team. Other tools might include Activity-Based Costing, Process Modeling or Flowcharting tools. The advantages offered by the bridge programs are in time saving and accuracy, as the data need not by manually keyed into each tool.

Advantages Over the Prior Art

The combination of facilitated work sessions and GroupWare products, when applied to the Activity Based Management process, allows an organization to optimize its resources to perform Activity Based Management in less time than it would otherwise have required. The facilitated work sessions allow the ABC work team to focus their efforts and make effective use of their time. They also promote teamwork and ownership of the activities they are responsible for. The GroupWare tools allow the work team to quickly collect, organize, and document their ideas. At the end of the facilitated session, the team has immediate documentation of their work.

Alternative Embodiments

It will be appreciated that, although specific embodiments of the invention have been described herein for purposes of illustration, various modifications may be made without departing from the spirit and scope of the invention. All of the work described above can be performed by individuals or groups working in traditional fashion, that is, without the aid of a facilitator and GroupWare tools. Work done by individuals must be reviewed by others in order to assure correctness. Numerous iterations of drafts and reviews are generally required before all parties concur with the decision or document. These iterations require time.

Facilitated work sessions utilizing GroupWare tools improve the process by avoiding the iterations and involving the right people up front. Work done by groups often lacks in quality because of unequal participation among team members. Typically a small percentage of the group dominate the discussions and exert undue influence over the resulting decision or document. Other members of the group may not buy into the resulting decision or document as a result. The implications of this generally don't show up until later on when recommended actions are not taken. Again, time is required to sort this out and correct the problem. Rework is often required to document the decision or process so that everyone is in agreement. Facilitated work sessions utilizing GroupWare tools improve the process by giving everyone an equal voice and gaining consensus up front. The process described in the example above is not the only alternative for integrating GroupWare and the Activity Based Management methodology. Other GroupWare tools exist besides TeamFocus and ABC Technology EasyABC and can be used in their place. Accordingly, the scope of protection of this invention is limited only by the following claims and their equivalents.

We claim:

1. A method for establishing and documenting a cost of a business process based on activities undertaken to complete the process, comprising the steps of:

providing a plurality of input means for simultaneous input of language information by a plurality of participants into a network computer system, and means for simultaneously presenting the information input by the plurality of participants to a multitude of the participants, and means for prompting the participants to vote to reach a consensus regarding the correctness of the input information;

simultaneously soliciting from a plurality of the participants information including information identifying significant business processes;

inputting into the computer system the information solicited from the participants, by a plurality of the participants;

presenting the input information to the participants;

reaching consensus on the correctness and completeness of the input information to verify the information;

storing the verified information;

converting the verified information into a preselected format suitable for a decomposition tool including accessing the verified information by a bridge program;

executing the decomposition tool to construct a decomposition diagram based on the verified information; and providing access to the decomposition diagram for use by each of the participants.

2. The method of claim 1, wherein converting the verified information further includes the steps of:

opening formatted text files;

building the formatted text files including reading the stored information solicited from the participants and, for each item read from the stored information solicited from the participants, building an object record for one of the formatted text files; and closing the formatted text files and writing them to a preselected destination directory accessible by the decomposition tool, the stored information solicited from the participants inaccessible to the decomposition tool.

3. The method of claim 1, in which:

inputting information further includes the steps of:

inputting into the computer system information concerning department activities related to one of the business processes including costs of the department activities;

inputting into the computer system information concerning drivers that affect a cost of resources, by a plurality of the participants; and inputting into the computer system information concerning a percentage of the resources consumed by each of the department activities; and the method further comprises the step of executing a second bridge program to access and reformat the verified information into formats suitable for use by preselected database tools for producing documents.

4. The method of claim 3, in which inputting information further includes steps of:

inputting into the computer system for storage information concerning drivers that influence a cost of department activities; and inputting into the computer system for storage information concerning cost objects that consume each of the department activities including a percentage of time spent on each of the cost objects and a percentage of each of the department activities consumed by each of the cost objects.

5. The method according to claim 4, wherein executing a second bridge program includes the steps of:

creating a first import file including extracting the information concerning department activities;

creating a second import file including extracting the information concerning cost objects that consume each of the department activities including not extracting a cost object already extracted;

creating a third import file including reading comment files for activities based on the information input into the computer system concerning department activities and on the information concerning cost objects; and creating a fourth import file including reading the information concerning drivers that affect the cost of resources and the information concerning drivers that influence the cost of activities.

6. The method of claim 3, wherein executing a second bridge program includes the steps of:

revalidating data fields of the information input into the computer system;

formatting the information input into the computer system including reading and assigning the information to node variables; and writing the information to data files having the formats suitable for use by preselected database tools for producing documents.

* * * * *